United States Patent
Baptista de Lima

(10) Patent No.: US 11,984,757 B2
(45) Date of Patent: May 14, 2024

(54) DEVICE FOR CONTROLLING SOLAR DRIVEN WATER PUMPS AND METHOD IN WHICH SUCH A DEVICE IS APPLIED

(71) Applicant: WELL PUMPS, société anonyme, Fleurus (BE)

(72) Inventor: Nuno André Rocha Baptista de Lima, Póvoa de Varzim (PT)

(73) Assignee: WELL PUMPS, SOCIÉTÉ ANONYME, Fleurus (BE)

( * ) Notice: Subject to any disclaimer, the term of this patent is extended or adjusted under 35 U.S.C. 154(b) by 114 days.

(21) Appl. No.: 17/776,492

(22) PCT Filed: Nov. 13, 2019

(86) PCT No.: PCT/IB2019/059737
§ 371 (c)(1),
(2) Date: May 12, 2022

(87) PCT Pub. No.: WO2021/094814
PCT Pub. Date: May 20, 2021

(65) Prior Publication Data
US 2022/0393500 A1 Dec. 8, 2022

(51) Int. Cl.
*H02J 9/06* (2006.01)
*H02J 3/32* (2006.01)
(Continued)

(52) U.S. Cl.
CPC .................... *H02J 9/06* (2013.01); *H02J 3/32* (2013.01); *H02J 3/381* (2013.01); *H02J 7/0013* (2013.01);
(Continued)

(58) Field of Classification Search
CPC ...... H02J 9/06; H02J 3/32; H02J 3/381; H02J 7/0013; H02J 7/0049; H02J 7/02; H02J 7/35; H02J 2300/26; H02J 3/38
(Continued)

(56) References Cited

U.S. PATENT DOCUMENTS

| 6,590,793 B1 | 7/2003 | Nagao et al. |
| 2020/0408204 A1* | 12/2020 | Flaster ................. F04B 49/065 |

FOREIGN PATENT DOCUMENTS

| EP | 2512000 A2 | 10/2012 |
| WO | 2018141998 A1 | 8/2018 |

OTHER PUBLICATIONS

International Search Report & Written Opinion to corresponding PCT Application No. PCT/IB2019/059737 dated Apr. 8, 2020.

* cited by examiner

*Primary Examiner* — Richard Tan
(74) *Attorney, Agent, or Firm* — Dinsmore & Shohl LLP

(57) ABSTRACT

Device for controlling solar driven water pumps with three selectable modes on the control panel being: I) speed mode with 100% use of the available solar DC power at all times; II) solar mode using available solar DC power only, and III) eco mode combining the use of the available solar DC power with the use of the AC power from a grid or a generator and/or batteries, by automatic switching between two stages, being (i) solar stage running on solar DC power only, and (ii) hybrid stage running with solar DC power and AC power from grid or generator and/or batteries like in speed mode. The purpose of the present disclosure is to preferentially use solar energy from solar panels over AC current from the electric grid or from a generator and/or batteries while ensuring sufficient pumping capacity.

15 Claims, 4 Drawing Sheets

(51) Int. Cl.
     *H02J 3/38*          (2006.01)
     *H02J 7/00*          (2006.01)
     *H02J 7/02*          (2016.01)
     *H02J 7/35*          (2006.01)

(52) U.S. Cl.
     CPC .............. *H02J 7/0049* (2020.01); *H02J 7/02* (2013.01); *H02J 7/35* (2013.01); *H02J 2300/26* (2020.01)

(58) Field of Classification Search
     USPC ........................................................ 307/23
     See application file for complete search history.

DEVICE FOR CONTROLLING SOLAR DRIVEN WATER PUMPS AND METHOD IN WHICH SUCH A DEVICE IS APPLIED

CROSS-REFERENCE TO RELATED APPLICATIONS

The present application is the National Phase entry of International Patent Application No. PCT/IB2019/059737 filed Nov. 13, 2019.

TECHNICAL FIELD

The present disclosure relates to the field of water pumps that are driven at least partially by solar photovoltaic energy.

In arid areas of the world, agriculture depends on available water resources. To provide water, wells are drilled in the soil, in search of water reservoirs in the underground. When water is found, it is traditionally pumped up by hand driven pumps or by diesel engine water pumps.

The obtained quantities of water obtained by hand driven pumps are too small for intensive agriculture e.g. for large circular growing plots that are irrigated by a radial arm, spraying water over the complete surface of the circle by steadily sweeping the area with water pumped up at the center of the circular plot. In order to drive the water pump, energy must be provided either from an electric grid if available or otherwise from a fossil fuel driven generator.

BACKGROUND

In remote arid areas with no electric grid available and/or difficulties to obtain fossil fuel but with available sunshine, it is advantageous to use solar photovoltaic energy provided by local solar panels as much as possible since this energy is free of charge and is climate friendly.

A disadvantage of solar power for driving the water pumps is that it is not available at night and fluctuates during the day. The water pump on the other hand needs to be driven at least at a minimal speed to avoid serious damage to the pump and motor and should be driven at a requested speed to maintain water tanks level or water pressure based on the application.

One solution is to store surplus electrical energy from the solar panels in local batteries, that can be called on when the solar production is deficient.

Another solution is to have an electrical generator in standby that can generate electricity when needed, in case there is no public grid available.

A problem arises when the DC solar voltaic energy needs to be combined with the AC supply from the grid or from a generator or batteries.

When the radiation from the sun decreases such as when a cloud obscures the sun or when the sun sets, the available power for the pump will be insufficient to run at the requested speed and thus the speed of the pump will be reduced thus lowering water pressure and flow for e.g. irrigation, leading to an unacceptable situation. At this point existing systems will either switch over manually or automatically to a public grid or a local generator without further use of the remaining available solar energy.

WO 2018/141998 A1 describes the use of DC solar power from the sun or of AC power from a grid or generator to drive a watering system.

SUMMARY

The present disclosure allows the automated combination of solar DC power and AC power from a grid or generator batteries in three different and selectable modes on the device according to the present disclosure:

I) Speed Mode

The speed mode ensures the use of 100% of the available solar DC power at all times, by automatically taking the missing power from an AC source e.g. grid, generator or battery bank in case the solar DC power is insufficient to keep driving the water pump at the requested speed to maintain a constant water pressure and flow from the well.

This mode is suitable when constant irrigation is needed at any cost, but with utilizing at all times maximal solar energy recuperation.

II) Solar Mode

The solar mode runs on available solar DC power only and increases or decreases pump speed based on available solar DC power. When solar power is insufficient, the pump stays off.

This mode is suitable when the amount of solar power captured per day, provides sufficient but interrupted water supply, or when no alternative energy source is available.

III) Eco Mode

The Eco mode also combines the use of the available solar DC power and/or batteries together with the available AC power, but for a minimum requested amount of water to be pumped pro day. This mode switches between two stages, being (i) solar stage: runs on solar DC power only, and increases or decreases pump speed based on solar power like in solar mode; and
(ii) hybrid stage: runs at speed mode, with solar DC power and AC power from grid, generator and/or batteries.

This mode is suitable when a minimum amount of water has to be pumped pro day by using 100% of the available solar energy. Thus, AC power is only used when available solar energy is insufficient.

1. Description of Solar Power

Solar radiation is converted directly into electricity by photovoltaic cells generating a small direct current when solar light strikes a metal-semiconductor or a junction of two different semiconductors. Several cells needs to be grouped to obtain the desired power, as is done in any solar panel. By grouping the cells in different ways, one can get more voltage and/or more current, as it happens in any kind of electrical power source.

Based on solar radiation intensity, the solar panels present a typical I-V curve (electric current versus voltage) as shown in FIG. 3. The voltage-current relation is not linear and the calculation of the available power cannot be made by simple linear equation.

The I-V curve changes with the intensity of the solar radiation in $W/m^2$ falling on the solar panels. When the solar power goes down, the available current for the same voltage becomes also lower.

The I-V curve also changes with the temperature of the solar cells. When the temperature increases, the available voltage decreases.

The point of the I-V curve where the delivered power is maximal shifts all the time, so it is necessary to track this Maximum Power Point or MPP continuously to get the maximum efficiency out of the solar driven system.

In case solar energy only is used for pumping systems, it is only possible to work on the right hand side of the I-V curve, where the solar panels act as a voltage source. On the left hand side of the I-V curve, the solar panels become a current source, which is not suitable for direct operation of systems on solar power only.

2. Combination of Solar DC and Non-Solar AC.

How is the Electronic Control Unit or ECU of the system capable of driving a water pump making optimal use of the direct current from solar panels and of the alternating current from a grid?

The system is equipped with a Variable Frequency Drive or VFD that is responsible for converting input power into a three-phase power supply to the pumping motor. This power converter is able to adapt a DC power supply, coming from the solar array, to an AC power source, three phase, according to the motor expected voltage, typically 3×230 V or 3×400 V in Europe, but can address different voltages also, according to the requirements of different electric motors.

Without this conversion, it is impossible to supply three phase motors directly from the solar source.

To manage the working mode of the VFD, an electronic control unit or ECU is part of the system and is responsible for controlling the working behavior of the VFD.

This ECU as master has firmware that interacts with the VFD as slave, managing the working mode or supply frequency based on available solar power. Both devices make it jointly possible to adapt the supply frequency to the motor to be able to run continuously, without sudden stops due to a lack of solar power, unless the available solar power is not enough to run the motor at its lowest admissible speed that is previously configured such that it prevents serious damage to the pump and/or motor.

The ECU continuously monitors the voltage and the current from the solar source and, based on an algorithm, interacts with the VFD, always trying to utilize the maximum power available from solar radiation.

Besides monitoring the solar radiation, the ECU also monitors all the inputs of the system, including sensors, and makes decisions also based on system status.

To continuously utilize the maximum power available from the sun, the present disclosure uses a Maximum Power Point Tracking or MPPT algorithm, that is responsible for making all the decisions based on real-time system analysis and then controls the output of the system, being the energy supply to the motor.

The ECU provides some information to the operator by LED signaling and/or HMI, acting as an interface to the operator and reporting how the system is running.

3. Automatic Power Compensation

How are the two power sources, one being solar and DC and the other being AC, managed to supply the motor with power without any interruption?

The Automatic Power Compensation or APC algorithm takes care of this task by ensuring that the solar DC source always has priority, and the AC source comes in only to compensate for lack of power from the solar energy source.

The amount of consumed incoming AC power changes continuously based on solar radiation available and keeps the motor running at all times at the requested speed, usually a nominal speed or at maximum speed.

When solar power is sufficient, the AC source is completely switched off, optimizing in this way the global operating cost associated with the system.

The basis of this algorithm is the following: there are two types of voltages at input: DC and AC. The AC source is converted to DC by the VFD and the algorithm compares both DC voltages being solar and AC rectified. When the solar voltage is higher than the rectified one, the system runs on solar energy only. When the solar voltage becomes equal to the rectified one, the voltage is fixed and the change in solar power is based on the current, that increases or decreases based on the solar panel properties such as solar radiation level, temperature etc. while maintaining the voltage fixed.

Looking at the I-V curve, the fixed voltage is like a vertical line, where the voltage is defined by the rectified AC voltage. If the solar radiation becomes higher again and sufficient to run the pump at the requested speed, the AC supply is automatically switched off again and the system continues to work with solar power only. At the end of the day, literally when the solar radiation ends, the system will work on AC power only.

4. Selectable Modes 4.1 Speed Mode

In this option the required speed is defined by an external system, e.g. a pressure measurement of the water. The speed of the pump will constantly be adapted in order to maintain a constant pressure at the measurement equipment as required by the application in this example.

While working in this mode, the major algorithm is based on Automatic Power Compensation or APC, always giving priority to the solar power and taking only the power required to replace the "missing power" from the AC source. Because this system is based on pressure and not on nominal speed, the final speed of the pump may change to lower values, if the desired pressure is met, in contrast with the main APC algorithm where the aim is always to maintain the nominal speed.

To adapt the parameters of the constant pressure installation, an additional Human Interface or HMI is added, provided with a touch-screen where the user can change the main parameters and also gets some feedback on how the system is working, with focus on output pressure parameters.

The sensor type and the pressure ranges, including all the safety margins, can be configured by a HMI, with some restrictions imposed by the main algorithm to protect the system.

4.2 Solar Mode

The "Solar mode" uses solar energy only and the system only has to keep tracking the Maximum Power Point of the solar panel to utilize the maximum solar power available to drive the well pump.

When the available solar power is lower than the power used by the pump at its lowest admissible speed, the system will shut off the pump.

When sufficient solar energy is detected on the solar panel to reinstate the pumping of the pump above its lowest admissible speed, the system will restart the pump and will keep it running until a next dip under the lowest admissible speed shuts it off again.

4.3 Eco Mode

The "Eco mode" is an improved version of the Automatic Power Compensation or APC algorithm, which allows the system to work only on solar energy even when the solar voltage becomes lower than the AC rectified voltage.

By default, this mode works only with solar energy and changing to a combination of both AC and DC sources only by an algorithm decision, which is based on a number of stops of the pump within a certain time span. The pump will stop when the available power is lower than the power utilized by the pump at its lowest admissible speed.

If this situation occurs, the system will start on a full Automatic Power Compensation or APC algorithm mode and then, after a predefined time lapse, it will check again if there is enough solar radiation available to avoid the use of an AC power source, improving the optimization of the system (see FIG. 2).

When there is no solar power source, e.g. during the night, the time delay to check again if there is enough solar power is increased, reducing the motor starts and consequently the time without water.

In this Eco mode, the power source is continuously changed automatically from DC to DC+AC or the opposite, without any user intervention. It runs as a standalone system, maintenance and operation free.

4.4 Solar and Generator Mode

This special option can be used when the AC source is a generator set instead of an electric grid. In this case a need arises to manage the load of the generator set with the aim of increasing its life span. To guarantee a long life time and a low maintenance cost, the output power of a generator set must be between certain levels defined by the generator manufacturer e.g. higher than 30% of the generator nominal power.

This means that when the solar power is not sufficient to run the pump at the requested speed, the generator has to supply the missing power even when this missing power amounts to less than 30% of the nominal generator power. In order to do so, an extra load is attached to the generator, e.g. batteries to be charged or managed with the solar production.

Once the batteries are fully charged, the algorithm will automatically cut the AC generator set and the battery DC power is then used to run the pump when the solar power is not sufficient to run it at the requested speed.

As soon as the battery power level is too low, the generator set will be started again to provide extra AC power.

Depending on the needs of the application, the number of batteries can be tuned.

The extra load to the batteries when the AC generator is automatically cut, is controlled by an auxiliary controller, using a proprietary algorithm that avoids any interference with the main pumping system (see FIG. 4).

BRIEF DESCRIPTION OF THE DRAWINGS

With the intention of better showing the characteristics of the present disclosure, hereafter, as an example using a water well installation without any limitative character, an embodiment of a device for controlling solar driven well pumps is described, with reference to the accompanying drawings, wherein:

FIG. 3 graphically shows the relation between voltage and current at different levels of solar irradiation;

DETAILED DESCRIPTION

Figure 1A:
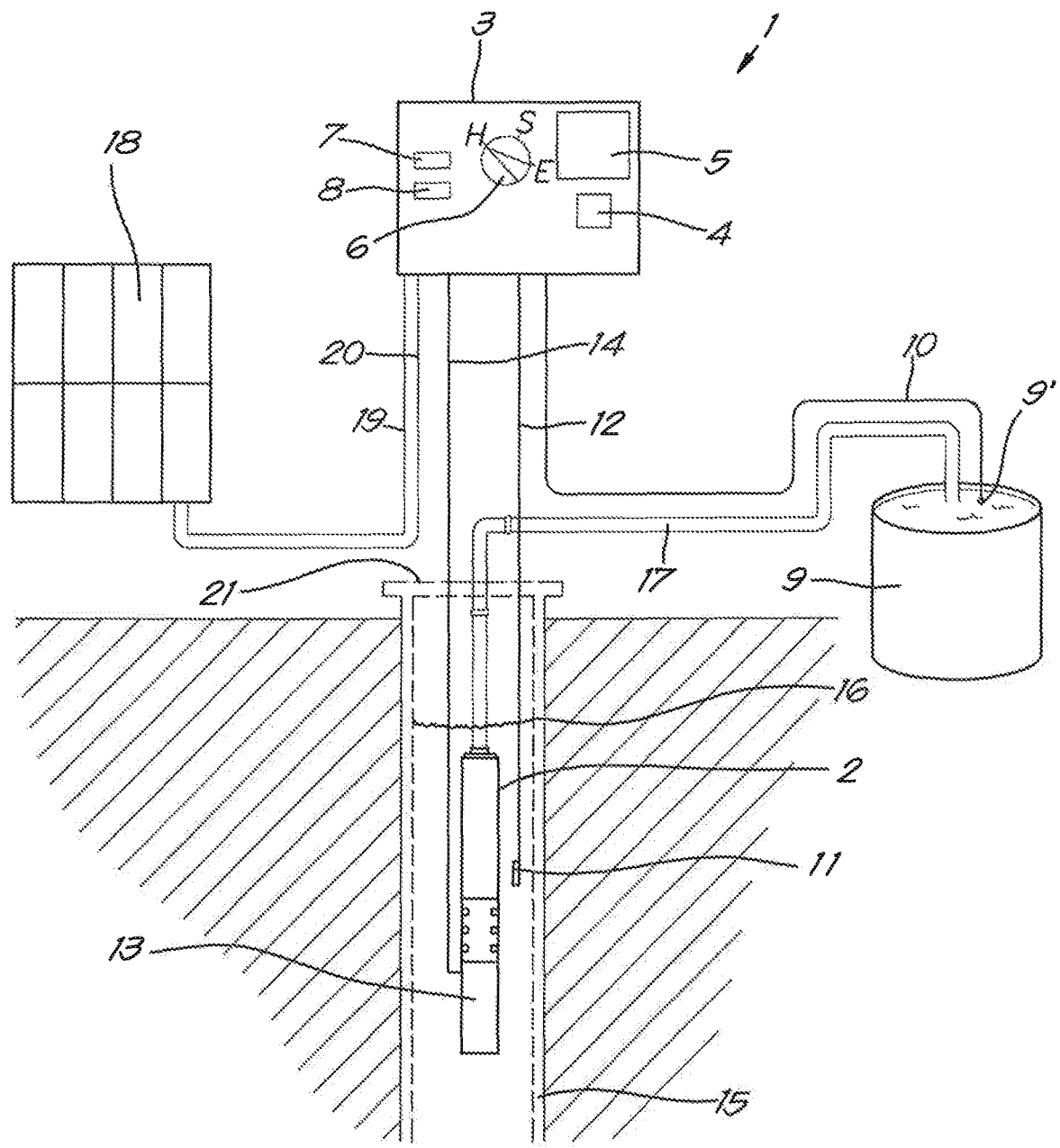
FIG. 1A schematically represent a device for controlling a solar driven well pump connected to a water tank according to the present disclosure.

The device 1 for controlling a solar driven well pump 2 represented in FIG. 1A comprises a control box 3, containing an electronic control unit 4, a power supply 5, a selector 6 for selecting speed mode H, Solar mode S, or Eco mode E, a DC breaker switch 7 and an AC breaker switch 8 and is connected with a water tank 9 level sensor 9' by a cable 10, with a well level probe 11 by a cable 12 and with the well pump motor 13 by a cable 14. The well pump 2 is positioned in a drilled shaft 15 below the ground water table 16 and is connected by a water pipe 17 to the water tank 9. The control box 3 is further connected to an array of solar cells 18 by two cables 19, 20. The well shaft 15 is protected by a removable mantle and lid 21.

Figure 1B:
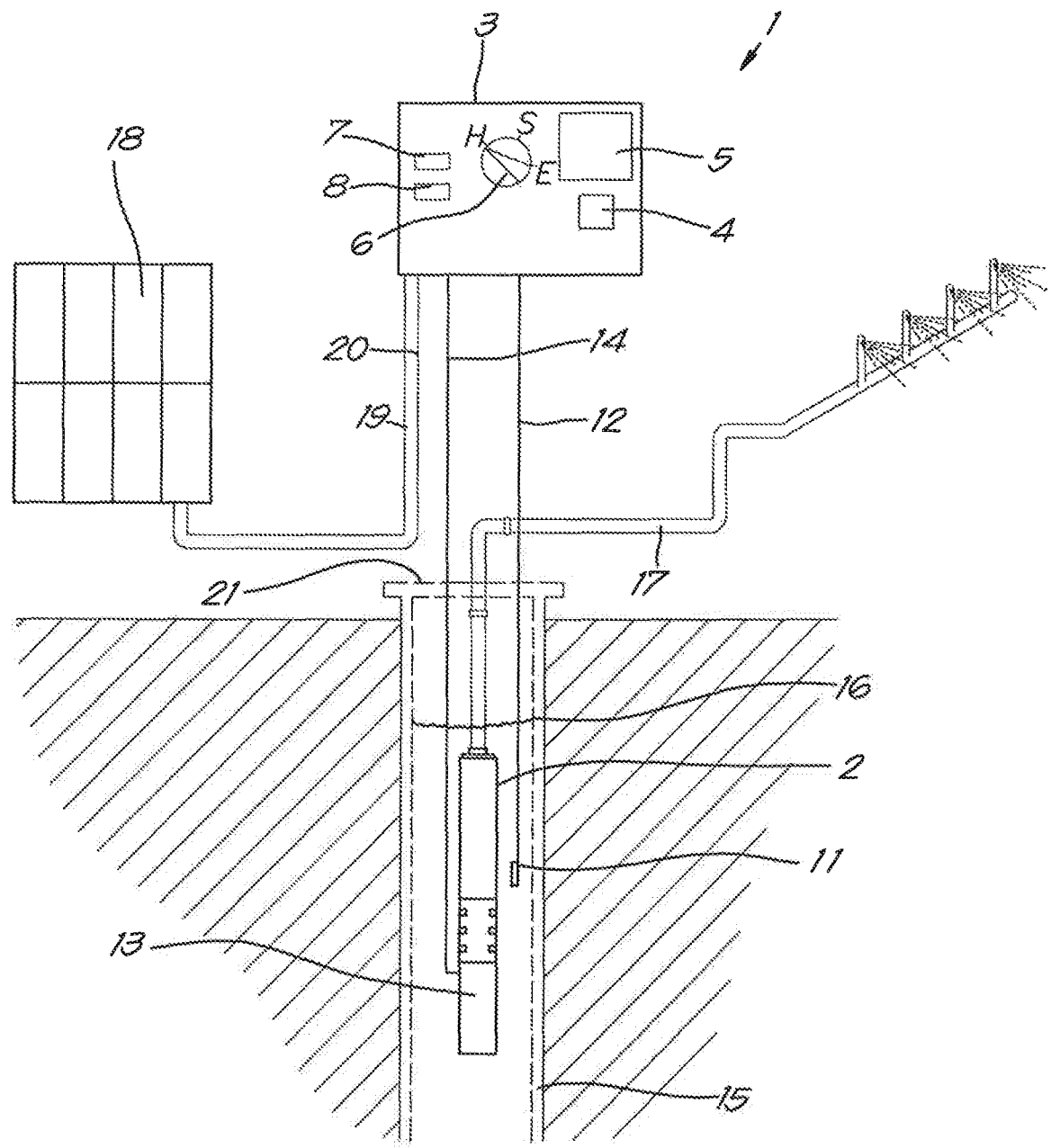
FIG. 1B schematically represent a device for controlling a solar driven well pump connected to an irrigation system according to the present disclosure.

FIG. 1B shows the same installation as FIG. 1A except that the pipe 17 delivers water to an irrigation system.

Figure 2:
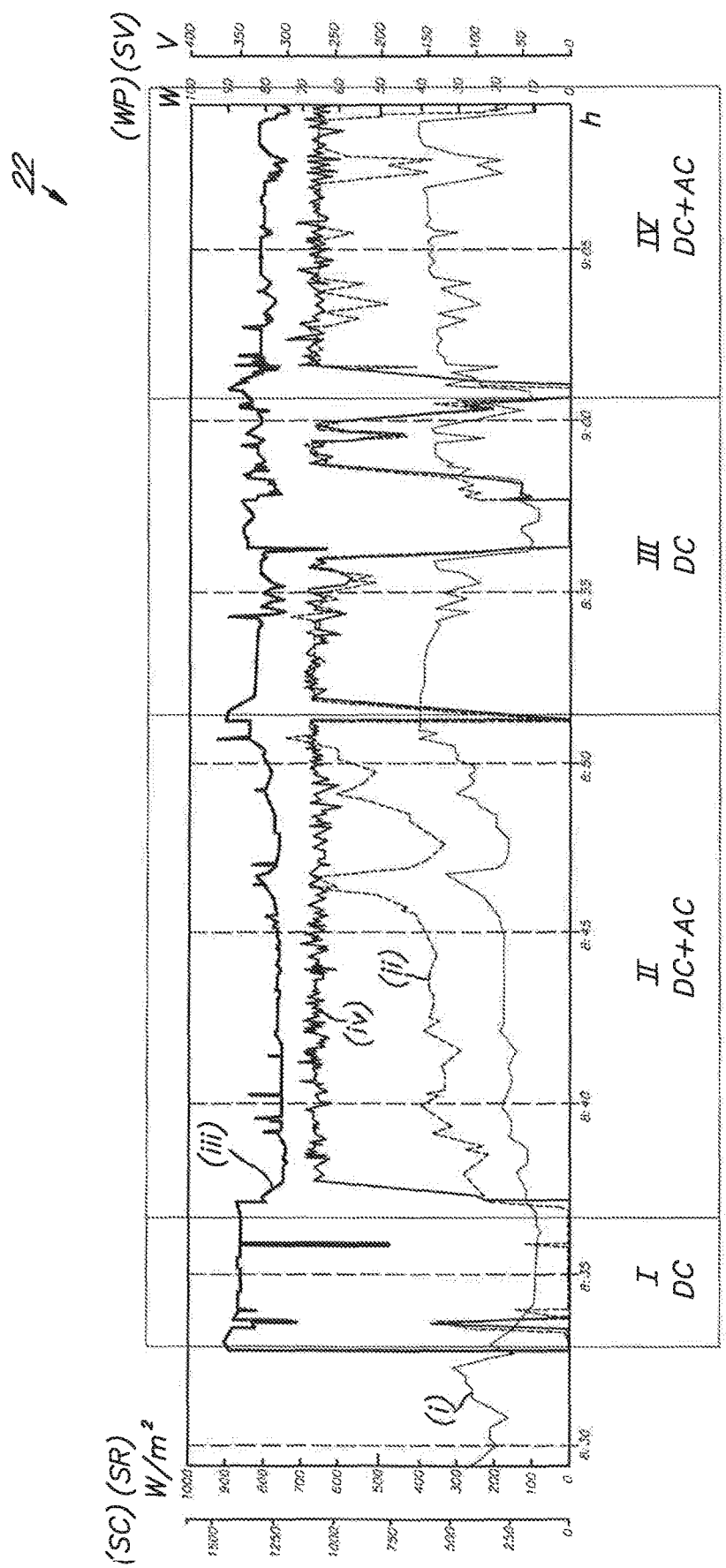
FIG. 2 graphically shows successive time phases in driving a well pump in an ecological mode.
Figure 5:
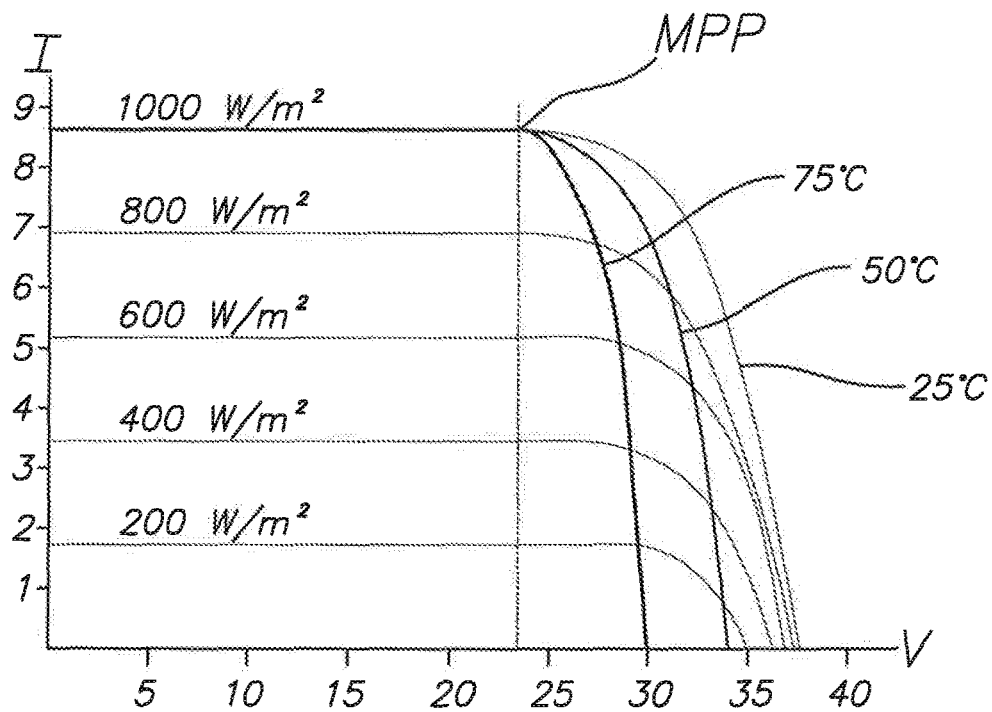

FIG. 2 shows a graph 22 of four measured parameters as a function of time of the day when driving a well pump in Ecological mode. The x-axis gives the hour of the day divided in 5 minute fractions, while the y-axis shows:
(i) measured solar radiation (SR) in Watt/m$^2$;
(ii) solar power from the solar cells (SC) on a scale of 0-1600 Watt or J/s;
(iii) solar voltage (SV) from the solar cells on a scale of 0-400 V;
(iv) hydraulic power of the well pump (WP) on a scale of 0-100 Watt.

The time axis (h) is divided in four consecutive time blocks being
I—a first time block using solar energy only, followed by
II—a second time block using both solar energy and energy from an electric grid or generator and/or batteries, followed by
III—a third time block using solar energy only, followed by
IV—a fourth time block using both solar energy and energy from an electric grid or generator and/or batteries.

The method applied by the device 1 for controlling a solar driven well pump 2 in Eco-mode according to the present disclosure is as follows.

The device 1 for controlling the well pump is switched to Eco mode by turning the selector 6 to Eco mode E. The electronic control unit 4 will, starting from dawn when solar radiation is picking up in time block I, make a programmed number of tries to start the well pump 2 on solar energy only. In this particular case, the solar radiation is not sufficient yet to be able to pump water at the minimal hydraulic power required to safely operate the pump. After, in this case three tries, the electronic control unit 4 switches the operation mode automatically to Speed mode, where the missing power is now taken from an AC grid or generator and/or batteries.

During time block II the pump runs at the required speed and is fed by the AC grid but also by some solar energy at times when it is available. After a programmed time delay the AC current is switched off, in this case after 15 minutes, and the pump 2 continues to run on solar energy only in time block III, until the available sun energy drops below a critical threshold, e.g. because the sun is hidden behind a cloud, thus halting the well pump 2. The device now again makes up to three tries in 10 minutes to switch on the well pump using solar energy only. If this fails for lack of solar power, the control unit 4 will automatically switch to Speed mode again, bringing in AC energy from a grid or generator to bring the hydraulic power of the well pump 2 back to full speed in time block IV, where both DC solar and AC grid power is used.

The operation in time block IV now is similar to the operation in time block II and the control unit 4 will, after a programmed time delay, switch off the AC current again, followed by a purely solar driven time block V, etc.

The electronic control unit 4 ensures in this way that a minimum required quantity of water is pumped up daily, and that this is achieved by using as much solar energy as possible when it is available and by using AC energy from a grid or generator only to the extent that it is needed to ensure the required quantity of water.

FIG. 3 shows the relation between voltage (V) and current (I) at different levels of solar irradiation on photovoltaic cells. The X-axis represents the electric current I, while the Y-axis represents the electric voltage V. Curves are shown for different intensity levels of solar radiation, expressed as Watt/m2 of solar energy received by the photovoltaic cells.

The graph also shows the relation between voltage and current for an intensity level of 1000 W/m2 of solar energy received for three different ambient temperatures: 25° C., 50° C. and 75° C.

From the graph it is clear that the voltage-current relation is not linear and that when the solar power goes down, the available current for the same voltage also diminishes. The graph also reveals that changes in temperature of the photovoltaic cells have an influence on the available voltage: when the temperature increases, the available voltage goes down.

All this implies that the optimal point in the I-V curve where the power is maximum changes continuously and so it is necessary to track this maximal power point or MPP continuously to obtain the maximum efficiency of the system.

In the case of solar driven pumping systems, it is only possible to work on the right hand side of the curve, where the system acts as a voltage source. On the left hand side, the solar generator becomes a power source which is not suitable for operating systems with solar power only.

The desired voltage range or current can be obtained by connecting solar panels in series, which will increase the voltage, and by connection solar panels in parallel, which will increase the final current. This means the configuration of the solar panels needs to be tailored to the needs and requirements of the application, in this case of driving a water pump.

Figure 4:
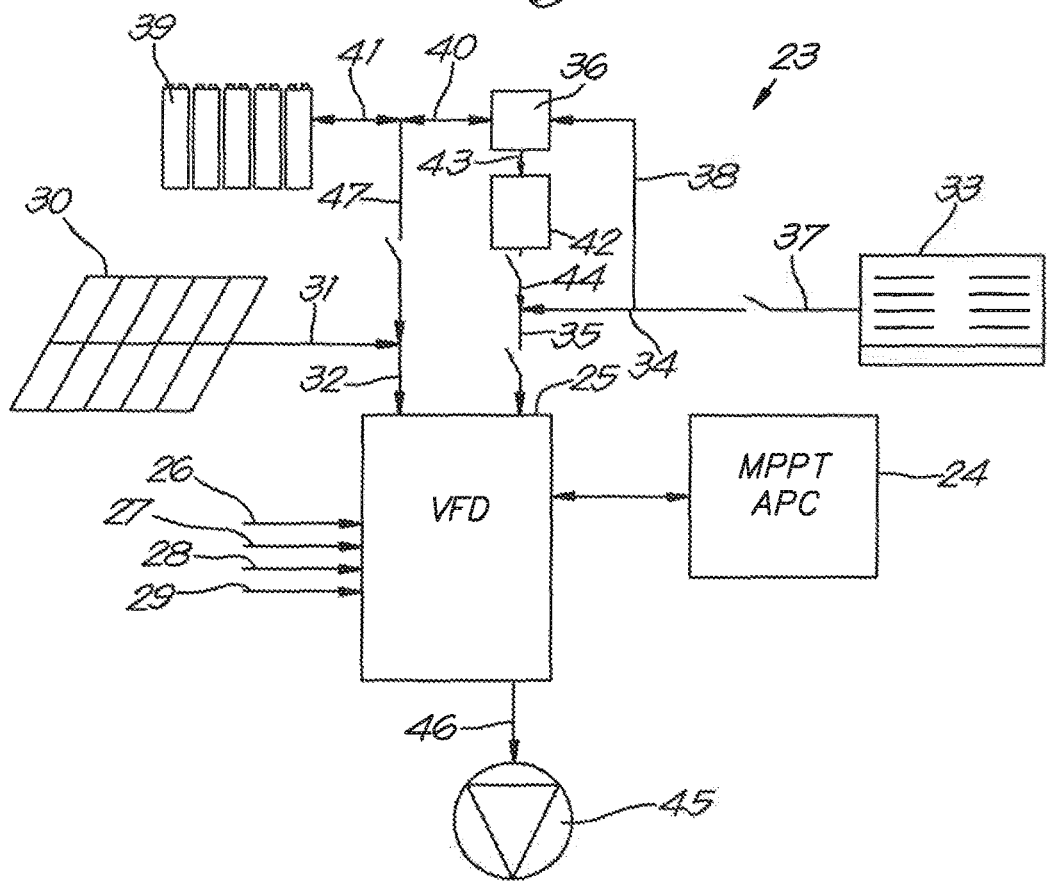
FIG. 4 schematically represents a device for managing solar energy and generator energy to drive a pump.

FIG. 4 schematically shows a device 23 for managing solar energy and generator energy to drive a pump that is supplied with AC. The device is controlled by a master electronic control unit 24, that is equipped with Maximal Power Point Tracking software (MPPT) and Automatic Power Compensation software (APC) and controls a slave Variable Frequency Drive (VFD) 25 that can receive sensor inputs from a temperature probe 26, a dry run switch 27, a water level switch 28 and a pressure transducer 29.

A solar array 30 delivers DC and feeds it to the VFD through cables 31, 32. A generator set 33 delivers AC to the VFD 25 through cables 34,35, or alternatively to a charger 36 through cables 37, 38. The charger 36 delivers DC to a battery pack 39 through cables 40, 41. The battery pack 39 can also provide DC directly to the VFD 25 through cables 41, 47, 32 or AC through the charger 36 and inverter 42 and through cables 41, 40, 43, 44, 35. The VFD 25 supplies AC to the pump 45 through cable 46.

The device 1 for controlling a solar driven well pump 2 according to the present disclosure can be used in several applications where water is needed and is not limited to agricultural irrigation or to water well installations.

It is also possible to apply the device to the production of drinking water where it can be steered by a water sensor in the storage tank for drinking water. In case the storage tank is full, the well pump can then be stopped and no more energy is then consumed.

It is evident that the device according to the present disclosure can be applied to be solar driven applications other than the present water well pump, where an optimal ecological balance is sought for the use of the solar energy or another variable green energy such as wind energy.

The present disclosure is in no way limited to the embodiment described by way of an example and represented in the figures, however, such a device for controlling solar driven water pumps can be realized in various forms without leaving the scope of the present disclosure, as it is defined in the following claims.

The invention claimed is:

1. A device for controlling solar driven water pumps, wherein the device allows an automated combination of a solar DC power from a solar photovoltaic array and an AC power from an AC grid or an AC generator and/or a set of batteries in three different and selectable modes on the device:
   I) a speed mode configured to ensure to use 100% of the solar DC power available from the solar photovoltaic array at all times, by automatically taking missing power from the AC grid or the AC generator and/or the set batteries in case the solar DC power is insufficient to keep driving a water pump at a requested speed;
   II) a solar mode configured to run on an available solar DC power only, and arranged to increase or decrease a water pump speed based on the available solar DC power, and to shut off the water pump when the available solar DC power is insufficient; and
   III) an eco mode configured to use the available solar DC power together with the AC power from the AC grid or the AC generator and/or the set of batteries arranged to pump a minimum quantity of water to be pumped per day and that switches between two stages, being
     (i) a solar stage configured to run on the available solar DC power only, and
     (ii) a hybrid stage configured to run with the solar DC power and the AC power from the AC grid or the AC generator and/or the set of batteries like in the speed mode, delivering a constant water pressure from the water pump.

2. The device according to claim 1, wherein the automatic combination of the solar DC power and the AC power is controlled by an electronic control unit, the electronic control unit configured to control a variable frequency drive that is responsible for converting input electric power into a three-phase power supply to a motor of the water pump and is arranged to adapt the solar DC power, coming from the solar photovoltaic array, to an adapted AC power, three phased, according to a motor expected voltage.

3. The device according to claim 2, wherein the electronic control unit is configured to continuously monitor voltage and current from the solar photovoltaic array and, based on an algorithm, to interact with the variable frequency drive, always trying to utilize maximum power available from solar radiation, and to monitor several inputs of the electronic control unit, including input from sensors, and to make decisions based on the inputs of the electronic control unit.

4. The device according to claim 3, wherein the electronic control unit is configured to use a maximum power point tracking algorithm enabling the electronic control unit to make all the decisions based on real-time analysis of the inputs of the electronic control unit and then to control an output of the device, being the energy supply to the motor of the water pump.

5. The device according to claim 1, wherein an electronic control unit is configured to run during the hybrid stage (ii) with the solar DC power and the AC power from the AC generator, arranged so that an output power of the AC generator set is always set higher than a safety power level of the AC generator, and so that any surplus of electric energy is fed to charge the set of batteries, which when the set of batteries are fully charged, cause the AC generator to be automatically cut, and in that DC power of the set of batteries is then used to run the water pump when the DC solar power is not sufficient to run the water pump at a requested speed, until a power level of the set of batteries is too low, and the AC generator is automatically started again to provide extra AC power.

6. The device according to claim 5, wherein an extra load to the set of batteries when the AC generator is automatically cut, is controlled by an auxiliary controller, using a proprietary algorithm that avoids any interference with the device for controlling the water pump.

7. A method applied by the device for controlling the solar driven water pumps of claim 1 wherein the eco mode is selected, the method comprising at least the following steps:
  turning a selector to the eco mode on an electronic control unit, whereafter the electronic control unit is configured to:
  monitor an amount of the solar DC power available from the solar photovoltaic array;
  make a programmed number of tries to start the water pump on the solar DC power only;
  when a solar radiation is not sufficient to pump water at a minimal hydraulic power required to safely operate the water pump, automatically switch from the (i) solar stage to the (ii) hybrid stage where the missing power is now taken from the AC grid or the AC generator but where the solar DC power is also used when it is available;
  switch off the AC power after a programmed time span, and lets the water pump continue to run on the solar DC power only until the solar DC power drops below a critical threshold and then stops the water pump;
  make a predefined number of tries again in a predefined number of minutes to switch on the water pump on the solar DC power only;
  when the switching on the water pump fails for lack of the solar DC power, automatically switches to the (ii) hybrid stage again, bringing in the AC power from the AC grid or the AC generator and/or the set of batteries to bring a hydraulic power back to a required level, where both the solar DC power and the AC power are used;
  continue automatically switching between the (i) solar mode and the (ii) hybrid mode when the selector is switched to the eco mode.

8. The method according to claim 7, wherein when, within a programmed time lapse, the solar DC power remains too low for a minimum speed of the water pump, the electronic control unit switches to the (ii) hybrid stage and the AC power is brought in to drive the water pump to at least a minimal safe speed.

9. The method according to claim 8, wherein, after running the water pump for the programmed time lapse at a requested speed to maintain the constant water pressure, the (ii) hybrid stage is automatically switched off by the electronic control unit and the device returns to the (i) solar stage and the water pump is back on the solar DC power only, where the water pump will have to run between a full speed and the minimum speed.

10. The method according to claim 9, wherein after returning to the (i) solar stage, the (i) solar stage is maintained until the solar DC power decreases so much that a minimum power to run the water pump at the minimal safe speed is no longer available, whereafter the electronic control unit stops the water pump.

11. The method according to claim 10, wherein after the programmed time lapse after the water pump stops, the electronic control unit automatically tries to start the water pump again in the (i) solar stage on the solar DC power only.

12. The method according to claim 11, wherein when, within the programmed time lapse, the solar DC power remains too low for a minimum pump speed, the electronic control unit switches back to the (ii) hybrid stage and the AC power is brought in to run the water pump at the requested speed.

13. A method applied by the device for controlling the solar drive water pumps according to claim 1, wherein the speed mode is selected, the method comprising:
  setting an output power of the AC generator always higher than a safety power level of the AC generator;
  feeding any surplus of electric energy to charge the set of batteries;
  automatically cutting the AC generator when the set of batteries are fully charged;
  running the water pump on DC power from the set of batteries when the solar DC power is not sufficient to run the water pump at the requested speed, until a power level of the set of batteries is too low; and
  automatically starting the AC generator up again to provide extra AC power.

14. The device according to claim 2, wherein the motor expected voltage is three phases 230 V or three phases 400 V.

15. The device according to claim 5, wherein the safety power level of the AC generator is 30% of a nominal power of the AC generator.

* * * * *